United States Patent [19]
Miura

[11] Patent Number: 5,395,465
[45] Date of Patent: Mar. 7, 1995

[54] METHOD FOR MANUFACTURING LAMINATE FOR HONEYCOMB STRUCTURE

[75] Inventor: Noriyasu Miura, Tomakomai, Japan

[73] Assignee: Oji Kenzai Kogyo Co., Ltd., Hokkaido, Japan

[21] Appl. No.: 72,395

[22] Filed: Jun. 7, 1993

[30] Foreign Application Priority Data

Jun. 9, 1992 [JP] Japan .................. 4-174855

[51] Int. Cl.⁶ .............................................. B32B 31/00
[52] U.S. Cl. ...................... 156/204; 156/227; 156/291; 156/474; 270/31; 493/422
[58] Field of Search .............. 156/197, 204, 227, 291, 156/459, 574, 474, 538; 493/415, 422, 424, 434, 413; 270/30, 31

[56] References Cited

U.S. PATENT DOCUMENTS

| | | | |
|---|---|---|---|
| 2,761,678 | 9/1956 | Cohn et al. | 493/413 |
| 3,166,456 | 1/1965 | White et al. | 156/204 X |
| 5,139,596 | 8/1992 | Fell | 156/197 X |
| 5,228,944 | 7/1993 | Seifried et al. | 156/197 |
| 5,277,732 | 1/1994 | Meier | 156/197 |

FOREIGN PATENT DOCUMENTS

| | | |
|---|---|---|
| 0335127 | 10/1989 | European Pat. Off. . |
| 0451455A2 | 10/1991 | European Pat. Off. . |
| 0531251A2 | 3/1993 | European Pat. Off. . |
| 0531525A1 | 3/1993 | European Pat. Off. . |
| 2807960 | 8/1979 | Germany ............... 156/227 |
| 30184/81 | 7/1981 | Japan . |
| 157847/85 | 8/1985 | Japan . |
| 255422/85 | 12/1985 | Japan . |
| 224825/88 | 9/1988 | Japan . |
| 63224825 | 1/1989 | Japan . |
| 396124 | 1/1933 | United Kingdom ........... 156/227 |

*Primary Examiner*—Michael W. Ball
*Assistant Examiner*—Michele K. Yoder
*Attorney, Agent, or Firm*—Oliff & Berridge

[57] ABSTRACT

A method and apparatus of manufacturing laminate for honeycomb structure. The invention includes first and second adhesive agent applying units, each of which applies an adhesive agent to a material strip in parallel strips, first and second pressing rolls corresponding to each of said adhesive agent applying units, and a layering table reciprocated by a predetermined stroke. The second stripes of the adhesive agent are displaced transversely by a half pitch from the first stripes of the adhesive agent. The adhesive agent applying units and the pressing rolls are disposed immediately above the layering table and the rolls press the material strip being fed onto the layered material strip, and are moved between an operating position and an un-operating position with relation to the movement of the layering table. The layering table is movable and a roll stand housing the pressing rolls moves in a direction opposite to that of the layering table.

3 Claims, 7 Drawing Sheets

METHOD FOR MANUFACTURING LAMINATE FOR HONEYCOMB STRUCTURE

BACKGROUND OF THE INVENTION

This invention relates to a method and an apparatus for manufacturing laminate for honeycomb structures and more particularly it relates to a method and an apparatus capable of easily and continuously manufacturing laminate for honeycomb structures comprising precisely formed cells and having excellent functional features such as a good air permeability.

PRIOR ART

Conventional methods and apparatuses for manufacturing laminate for honeycomb structures are generally classified into two types, those of a first type that involve steps of applying an adhesive agent to a material strip being unwound from a roll, drying it, cutting the strip to sheets of a unit length and bonding them together to form laminate for honeycomb structure and those of a second type that form a strip of laminate for honeycomb structure simply by bonding a number of component strips and winding it up onto a roll.

Additionally, there are methods and apparatuses of a third type, or a modified first type, where the applied adhesive may or may not be dried before the rolled material strip is cut to sheets of a unit length to form a laminate for honeycomb structure.

Technologies for the above described first, second and third groups are disclosed in Japanese Patent Laid-Open Nos. 224825/88, 157847/85 and 255422/85 and Japanese Patent Publication 30184/81 respectively.

In any of the above conventional methods and apparatuses, an emulsion type adhesive agent containing water or a solvent other than water as a diluent or a hot-melt type agent containing synthetic resin that becomes adhesive when heated and/or pressurized is normally employed.

The method and apparatus according to said Japanese Patent Laid-Open No. 224825/88, which belong to the first type, require complicated mechanical and electric means for establishing and maintaining a given ratio of the rate of revolution of a roll of a strip-shaped material to which an adhesive agent being applied to that of another roll of the material which is being cut in order to produce sheets of the material of a given unit length and, additionally, steps for drying the applied adhesive agent.

The complicacy of this technique makes the overall process of manufacturing laminate for honeycomb structure rather inefficient.

Japanese Patent Laid-Open No. 157847/85 proposes a technique belonging to the second category of producing a roll of a strip-shaped multilayer structure wound up on a drum by bonding a number of component strips, which is then dried and cut to sheets of unit size. This technique requires an apparatus having a complicated structure for aligning lines on the component strips in order to bond them together correctly and the adhesive agent used to bond the strips together requires to be dried well, making the technique as inefficient as the first one.

Each of the techniques belonging to the third type and disclosed in Japanese Patent Publication No. 30184/81 and Japanese Patent Laid-open No. 255422/85 entail complicated means for aligning sheets to be layered and cutting them to a unit length, making the overall process of manufacturing multilayer structures also rather complicated and cumbersome.

Any of the above described conventional methods and apparatuses thus comprise steps of drying the applied adhesive and cutting multilayered or single-layer strips to a unit length, requiring time from the application of adhesive agent to the formation of a multilayer structure and the operation of bonding component strips or sheets together and forming a multilayer structure cannot be carried out immediately after the application of adhesive agent.

Thus, if component strips or sheets for forming a honeycomb structure are composed of thin and soft or coarse tissues that are permeable to gas and water, any of the above quoted adhesive agents applied to a side of a strip can easily pass therethrough to the other side so that the bonded strips may become flat to form a single plate that may look like a plywood.

If a molten hot-melt type adhesive agent is applied to a side of a strip of a thin and soft or coarse material in an attempt to prevent it from passing to the other side, the long time spent from the application of the adhesive agent to the completion of the multilayering operation reduces the adhesiveness of the agent to consequently produce a honeycomb structure which is poor in stoutness. Additionally, the applied adhesive agent can easily pass to the other side to flatten the honeycomb structure once it is heated and/or put under pressure.

Furthermore, any of the above cited techniques involves cumbersome steps of detecting cutting positions on a strip, aligning the edges of prepared sheets and multilayering them neatly to a given number of layers, making it very difficult to manufacture high precision honeycomb structures.

When an adhesive agent is applied to each component sheet in a number of stripes and sheets are put together to form a multilayer structure, they can be swerved from one another to show a completely irregular arrangement as they are moved along a curved line from one work station to another.

In view of the above described problems and other problems of the prior art, it is therefore an object of the present invention to provide a method and an apparatus for manufacturing high quality laminate for honeycomb structure at a high yield by relatively simple means and without causing them to lose the honeycomb structure and become flat even if a thin and soft or coarse material which is permeable to gas and water and therefore through which an adhesive agent can easily pass is used.

SUMMARY OF THE INVENTION

According to a first aspect of the present invention, the above object is achieved by providing a method of manufacturing laminate for honeycomb structure, comprising the steps of; (a) feeding a material strip by a predetermined length to the uppermost surface of folded and layered material strip disposed on a layering table by forwardly moving said layering table by a stroke corresponding to said length; (b) applying a plurality of first stripes of an adhesive agent either to an upper surface of the layered strip on said layering table or a lower surface of the material strip being fed; (c) immediately pressing the material strip being fed to the layered strip; (d) folding a rear end of said length of the material strip; (e) feeding the material strip by the length to the surface of folded and layered material strip disposed on the layering table by moving backwardly a predetermined table by said stroke; (f) applying a plurality of second stripes of an adhesive agent to said surface, said second stripes being displaced transversely by a half pitch from the first stripes of the adhesive agent; (g) immediately pressing the material strip being fed to the layered strip; (h) folding the rear end of said length of the material strip; and (i) repeating the above (a) to (h).

Preferably, said layering table is reciprocated by the predetermined stroke, and means for feeding the material strip and means for applying a plurality of stripes of the adhesive agent are moved relative to said layering table.

Still preferably, a plurality of stripes of the adhesive agent are applied to a lower surface of the material strip being fed.

Alternatively, a plurality of stripes of the adhesive agent are applied to an upper surface of the layered strip on said layering table.

According to another aspect of the present invention, the above object is achieved by providing an apparatus for manufacturing laminate for honeycomb structure; comprising a unit for continuously feeding a material strip, and a layering table; said unit including a feeding orifice, first and second adhesive agent applying units, and first and second pressing rolls corresponding to each of said adhesive agent applying units; said layering table being moved forwardly and backwardly relative to the feeding orifice by a predetermined stroke; said adhesive agent applying units applying a plurality of first and second stripes of an adhesive agent to either to an upper surface of a layered strip on said layering table or a lower surface of the material strip being fed; said second stripes of the adhesive agent being displaced transversely by a half pitch from the first stripes of the adhesive agent; said pressing rolls being disposed on said layering table for pressing down the material strip on the layering table; said first adhesive agent applying unit and said first pressing roll being moved between an operating position and an un-operating position, said second adhesive agent applying unit and said second pressing roll being moved between an operating position and an un-operating position; when said layering table being moved forwardly, said second adhesive agent applying unit and said second pressing roll being in the operating position, and said first adhesive agent applying unit and said first pressing roll being in the un-operating position; and when said layering table being moved backwardly, said first adhesive agent applying unit and said first pressing roll being in the operating position, and said second adhesive agent applying unit and said second pressing roll being in the un-operating position.

Preferably, said unit for continuously feeding a material strip is reciprocated by the predetermined stroke relative to said layering table.

Still preferably, an applicator of the adhesive agent applying unit is disposed on the way to feed the material strip.

Alternatively, an applicator of the adhesive agent applying unit is disposed on the surface of the layered strip.

With a method and an apparatus according to the invention, a material strip fed through a set of tension rolls and other rolls at a given rate is folded by every predetermined length on a layering table reciprocating by a stroke corresponding to said length without being cut after an adhesive agent has been applied thereto so that the operation of applying an adhesive agent to a length of the material strip and bonding it to portions thereof that have already been layered can be repeated in a relatively simple and well controlled manner by simply controlling the turning points of the reciprocating layering table and clamping the layered material strip along the folded lines thereof. With such an arrangement, layers of the layered material strip do not need to be accurately aligned along the folded lines and therefore a method and an apparatus according to the invention is exempted from a cumbersome operation of aligning unit sheets before forming a laminate for honeycomb structure.

Thus, with a method and an apparatus according to the invention, a molten hot-melt type adhesive agent having a relatively high viscosity can be, if used, prevented from passing through a material strip from a side to the other thereof and, therefore, even if the material strip is made of a thin, soft and coarse material, a hot-melt type adhesive agent can be applied to it by adhesive agent applying units without the risk of passing through the material strip, which can be bonded together immediately after the application of the bonding agent, using a backup roll or a layering table as a support before the adhesive agent is cooled to deteriorate its performance.

The applied hot-melt type adhesive agent is rapidly cooled and hardened as it is brought to contact with the material strip so that it would not pass through the material strip from a side to the other thereof if the material strip is highly permeable to gas and water.

Additionally, since the method of the present invention does not involve any hot press operation after the formation of a laminate for honeycomb structure nor the use of a diluent for regulating the viscosity of the solvent of the adhesive agent, high precision laminate for honeycomb structures may be manufactured by using very thin material strips that are permeable to gas and liquid.

When one or more than one combinations of an adhesive agent applying unit and a pressing roll are arranged immediately above the layering table and housed in a unit for continuously feeding a material strip disposed above the layering table or in a roll housing stand which is integrally formed with and operated to move in synchronism with and relative to the layering table, the operating speed of the layering table relative to the roll housing stand can be increased to raise the rate of processing the material strip and hence the efficiency of manufacturing laminate for honeycomb structures.

When the adhesive agent applying sections of the adhesive agent applying units are arranged close to the respective pressing rolls and above the layering table, the time from applying the adhesive agent to bonding an additional length of the material strip to the layered portions thereof can be reduced to further improve the efficiency and productivity of the laminate for honeycomb structure producing operation and, still advantageously, the component layers of the laminate for honeycomb structure can be bonded firmly with one another with a reduced amount of highly viscous hot-melt type adhesive agent.

DESCRIPTION OF THE PREFERRED EMBODIMENTS

Now, the present invention will be described by referring to the accompanying drawings that illustrate preferred embodiments of the invention, but the scope of the invention is not limited to the embodiments.

Figure 1:
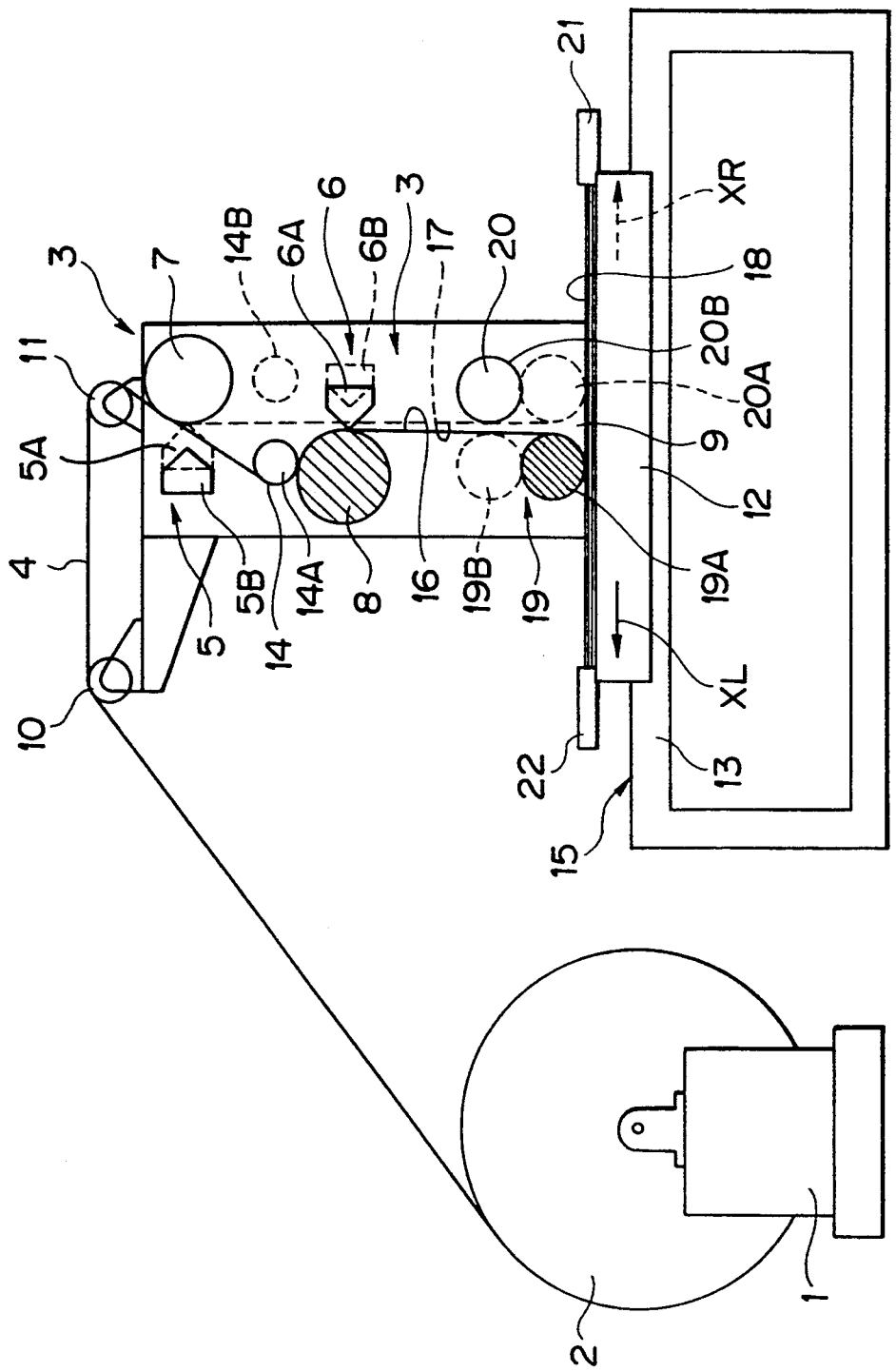
FIG. 1 is a schematic front view of an embodiment of apparatus for manufacturing laminate for honeycomb structures of the invention.

FIG. 1 is a schematic lateral view of the first preferred embodiment of the invention comprising a roll stand 1 rotatably carrying a roll 2 of a material strip 4, a continuous material strip feeding unit 3 and a layering table 12. The continuous material strip feeding unit 3 includes a mechanism for continuously feeding the material strip 4 from the roll 2, a pair of adhesive agent applying units 5, 6 which will be described hereinafter, a pair of back-up rolls 7, 8 and a pair of pressing rolls 19, 20. The layering table 12 can reciprocate at a predetermined stroke relative to said pressing rolls 19, 20. The material strip 4 is folded and pressed to form a multilayer structure by the selective operation of the continuous material strip feeding unit 3, the movement of the layering table 12 and the selective use of the pressing rolls 19, 20.

A pair of guide rollers 10, 11 are arranged at an upper portion of the continuous material strip feeding unit 3 in order to correct any swerving motion of the material strip 4. The back-up rolls 7, 8 and the adhesive agent applying units 5, 6 are disposed below said guide roller 11. Each of the back-up rolls 7, 8 is facing the respective adhesive agent applying units 5, 6 and the back-up roll 7 acts with the adhesive agent applying unit 5 and the back-up roll 8 acts with the adhesive agent applying unit 6. The material strip 4 is fed between the adhesive agent applying unit and the back-up roll.

An adhesive agent is applied to a side to be laminated of said material strip 4 in the form of parallel stripes to form a laminate for honeycomb structure. The layering table 12 and the adhesive agent applying unit 5 or 6 are selectively used. When the layering table 12 is moving in the direction of XL, the adhesive agent will be applied to a side 16 of the material strip 4 by the first adhesive agent applying unit 6 and the corresponding first back-up roll 8. The side 16 to be applied with the adhesive agent is positioned rearwardly. When the layering table 12 is moving in the direction of XR, the adhesive agent will be applied to a side 17 of the material strip 4, which side 17 is positioned forwardly, by the second adhesive agent applying unit 5 and the second corresponding back-up roll 7.

When the adhesive agent applying unit 6 is in its operating position 6A as indicated by a solid line in FIG. 1, it can apply the adhesive agent to the side 16 of the material strip 4 with the support of the corresponding back-up roll 8. The adhesive agent applying unit 6 does not apply the adhesive agent in its un-operating position as indicated by a broken line. In the un-operating position, the adhesive agent applying unit 6 is held away from the back-up roll 8.

Likewise, when the adhesive agent applying unit 5 is in its operating position 5A as indicated by a broken line in FIG. 1, it can apply the adhesive agent to the side 17 of the material strip 4 with the support of the corresponding back-up roll 7. The adhesive agent applying unit 5 does not apply the adhesive agent in its un-operating position as indicated by a solid line. When the unit 5 is in the un-operating position, it is held away from the back-up roll 7.

The adhesive agent applying units 5 and 6 move between the respective operating positions 5A, 6A and the respective un-operating positions 5B, 6B in an alternate manner in response to signals transmitted from the layering table 12 as a function of the reciprocating motion of the table 12.

When the adhesive agent is applied to the side 16, the material strip 4 is fed by the guide roller 11, runs along an inclined path as indicated by a solid line in FIG. 1, and passes between the back-up roll 8 and adhesive agent applying unit 6. A guide roller 14 is arranged near the back-up roll 8. When the guide roller 14 is in its operating position 14A as indicated by a solid line in FIG. 1, the material strip 4 may be running tightly on the outer peripheral surface of the back-up roll 8 in front of the adhesive agent applying unit 6 and therefore the adhesive agent may be stably applied to the material strip 4. On the other hand, when the guide roller 14 is in its un-operating position 14B as indicated by a broken line, the material strip 4 is not fed to the back-up roll 8 and passes between the back-up roll 7 and the adhesive agent applying unit 5 to apply the adhesive agent to the side 17. In such a case, the guide roller 14 is held back to its retreat position 14B as indicated by a broken line.

As described above, the guide roller 14 is selectively moved between its operating position 14A and un-operating position 14B depending on the mode of adhesive agent applying operation.

Figure 5:
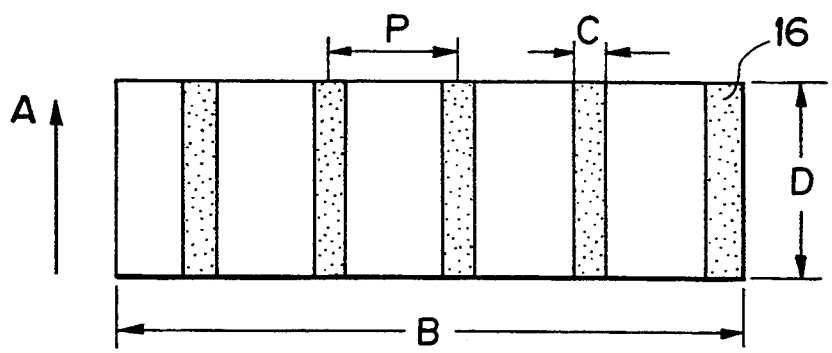
FIG. 5 is a schematic plan view of a material strip to which an adhesive agent is applied in parallel stripes.
Figure 6:
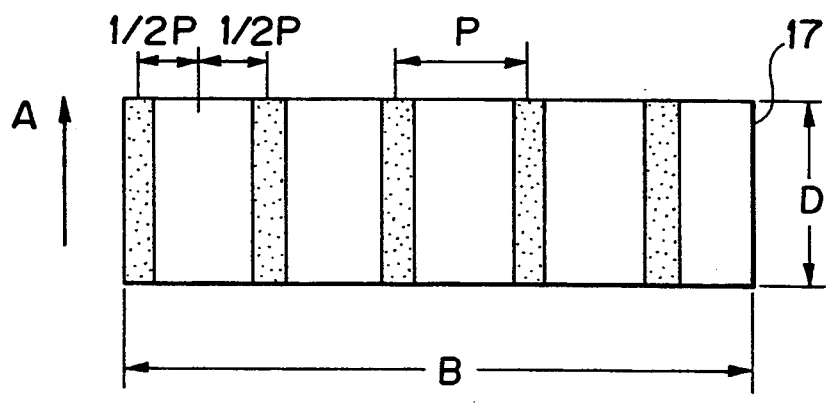
FIG. 6 is a schematic plan view of a material strip similar to FIG. 5 but showing parallel stripes of adhesive agent displaced by a half pitch relative to those of FIG. 5.

Each of the adhesive agent applying units 5 and 6 is provided with an applicator for applying the adhesive agent on the corresponding side of the material strip 4 in the form of parallel stripes. For example, the first strips of the adhesive agent are applied to the side 16 of the material strip 4 as illustrated in FIG. 5 and the second stripes of the adhesive agent are applied to the side 17 as illustrated in FIG. 6, each stripe having a width C of 5.8 mm, at a pitch P of 23.1 mm. The second strip is transversely displaced by a half pitch in the succeeding operating mode. The width and the pitch of the stripe is not limited to the above.

The pressing rolls 19, 20 that are used in combination with the respective adhesive agent applying units 6, 5, and are located at the opposite sides of a material strip feeding orifice 9 of the continuous material strip feeding unit 3 in such a manner that the pressing rolls press the material strip 4 with adhesive agent against the layered portions 18 of the material strip 4 on the layering table 12. After the adhesive agent is applied to the side 16 by the adhesive agent applying unit 6 for a predetermined stretch of the material strip 4, such stretch of the material strip 4 is pressed against the layered portions 18 of the material strip 4 by the pressing roll 19 located in its operating position 19A as indicated by a solid line in FIG. 1. The stretch of the material strip 4 is continuously fed onto the layering table 12 by the movement of the layering table 12 in the direction of arrow XL. The layering table 12 runs on a track 15 laid on a support structure 13.

The pressing rolls 19 and 20 operates for layering and pressing the material strip 4 on the surface of the layering table 12 in their respective operating positions 19A and 20A, whereas they are not operational in their respective un-operating positions 19B and 20B. Therefore, the pressing rolls 19 and 20 move between the respective operating positions 19A, 20A and the respective un-operating positions 19B, 20B in an alternate manner as a function of the mode of adhesive agent applying operation.

Thus, the operation of each of the adhesive agent applying units 5 and 6 and the pressing rolls 19 and 20 is so controlled by the signal from clamping units 21 and 22 disposed at the respective opposite ends of the layering table that, when the layering table 12 is moving in the direction of arrow XL, the adhesive agent applying unit 6 for applying the adhesive agent to the side 16 (rearwardly positioned) of the material strip 4 and the corresponding pressing roll 19 for touching the side 17 (forwardly positioned) to press down the material strip 4 as it is fed along the broken line in FIG. 1 are located in the respective operating positions 6A and 19A and, the adhesive agent applying unit 5 and the pressing roll 20 are retreat to their respective un-operating positions 5B and 20B.

Now, the operation of the above embodiment having an above described configuration to apply the adhesive agent to a length of the material strip 4, to layer and to press it, and to form finally a laminate for honeycomb structure will be described below.

The material strip 4 pulled out from the roll 2 proceeds along the solid line for side 16 in FIG. 1 and is guided by the guide roller 14. The material strip is supported by the back-up roll 8, and according to a direct application technique, the adhesive agent applying unit 6 is applying the adhesive agent to the side 16 for a predetermined length in parallel stripes, each stripe having a width C of 5.8 mm, in the longitudinal direction of arrow A as shown in FIG. 5 at a pitch P of 23.1 mm. The stretch of the material strip 4 with the under surface 16 is then pressed against the layered portions 18 of the material strip 4 by the pressing roll 19 and by the movement of the layering table 12 in the direction of arrow XL to complete the layering operation for the length that carries the adhesive agent on the side 16.

Figure 7:
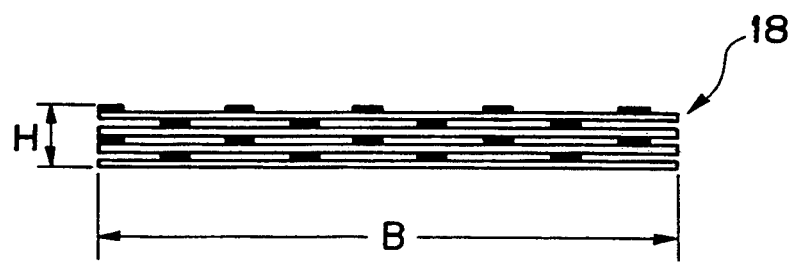
FIG. 7 is a schematic elevational view of a multilayer structure prepared by alternately layering strips as illustrated in FIG. 5 and those as illustrated in FIG. 6.
Figure 8:
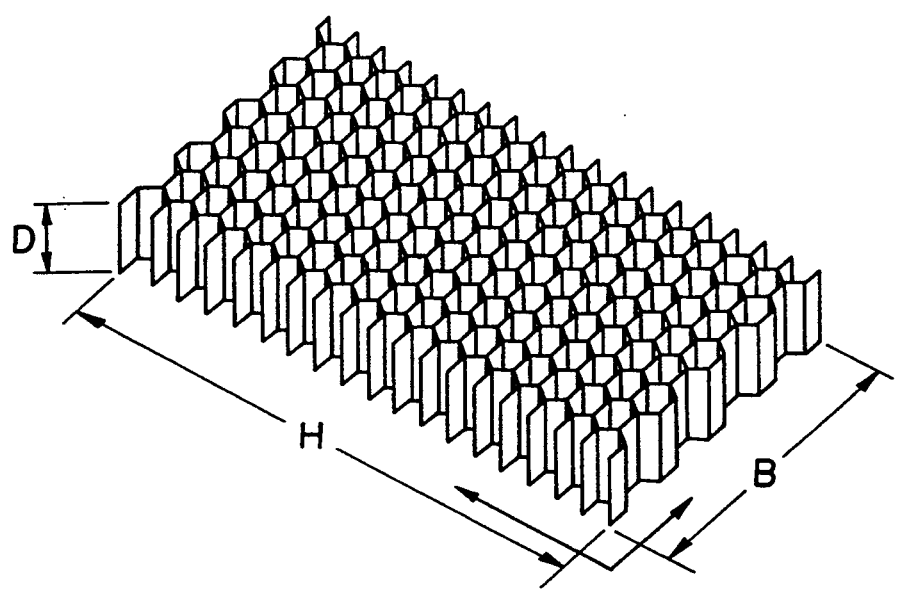
FIG. 8 is a schematic perspective view of the laminate for honeycomb structure obtained by vertically expanding the structure shown in FIG. 7.

In the mode of operation where the layering table 12 move in the direction of arrow XR, the material strip 4 proceeds along the broken line in FIG. 1, and the adhesive agent is applied to the side 17 to the length by the adhesive agent applying unit 5 in parallel stripes at a pitch P of 23.1 mm, each stripe C having a width of 5.8 mm, while the material strip 4 is supported by the back-up roll 7. The pitch and the width of this second stripes of the applied adhesive agent are same as those of the first stripes of the adhesive agent illustrated in FIG. 5, but the second stripes of the adhesive agent is transversely displaced by a half pitch relative to the first stripes as shown in FIG. 6. The stretch of the material strip 4 with the under surface 17 is pressed against the layered portions 18 of the material strip 4 by the pressing roll 20 while the layering table 12 is moving in the direction of arrow XL, so that a given number of layers are formed to produce a multilayer structure (laminate for honeycomb structure) as illustrated in FIG. 7. The multilayer structure is cut to a predetermined width D and expanded in the vertical direction H to form honeycomb structure as illustrated in FIG. 8.

When the clamps 21 and 22 disposed at the opposite ends of the layering table 12 are set to face to the feeding orifice 9 of the continuous material strip feeding unit 3, the material strip 4 is clamped by the clamps 21, 22, which by turn transmit a clamp signal to switch the moving direction of the layering table 12 as well as the operation of various units and rollers constituting the continuous material strip feeding unit 3.

In an experiment according to the embodiment, a roll of a material strip 4 was prepared by using nonwoven polyester fiber which was permeable to gas and water and had a weight per unit area of 40 g/m$^2$ and a thickness of 0.11 mm, and a modified olefin type hot-melt adhesive was applied to the material stripe 4 in parallel stripes at a pitch P of 23.1 mm, each stripe having a width C of 5.8 mm, to produce the honeycomb structure having a cell size of 10 mm.

Figure 2:
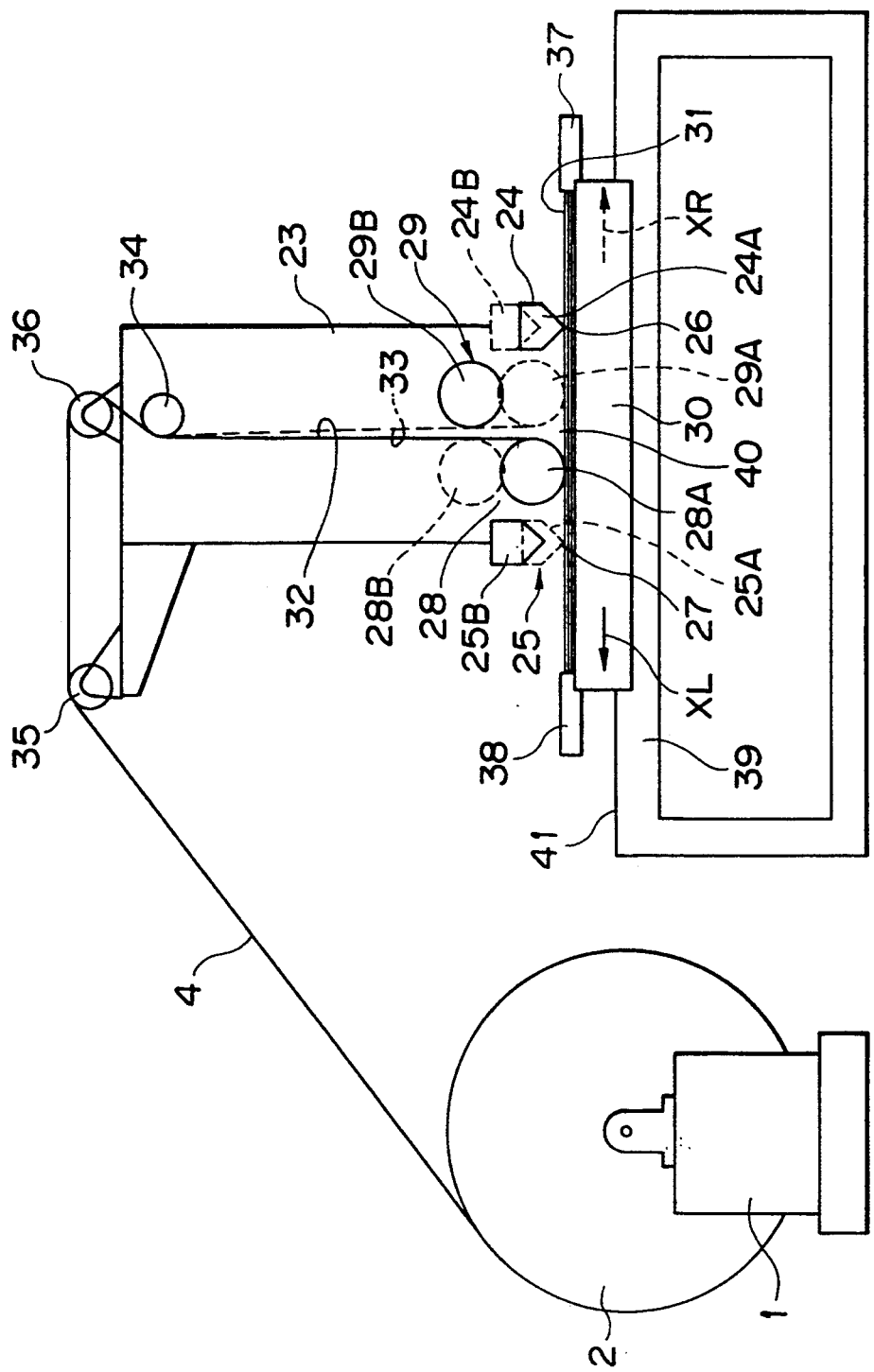
FIG. 2 is a schematic front view of another embodiment of apparatus for manufacturing laminate for honeycomb structure of the invention.

FIG. 2 shows a second embodiment of the invention. In this embodiment, a continuous material strip feeding unit 23 and a layering table 30. The continuous material strip feeding unit 23 includes a pair of adhesive agent applying units 24, 25 with respective applicators 26, 27 and a pair of pressing rolls 28, 29 which are oppositely arranged near a feeding orifice 40 for feeding the material strip 4. The feeding orifice 40 is located faced to and above the layering table 30 on which carries layered portions 31 of a material strip 4 thereon. The adhesive agent applying units 24, 25 are disposed close to the pressing rolls 28, 29.

Said pressing rolls 28, 29 operate in an alternate manner as they move between respective operating positions 28A, 29A and respective un-operating positions 28B, 29B depending on the side of the material strip 4 to be applied with an adhesive agent. The adhesive agent applying units 24, 25 operate in an alternate manner as they move between respective operating positions 24A, 25A and respective un-operating positions 24B, 25B.

Similar to the first embodiment described above by referring to FIG. 1, the roll stand 1 carries the roll 2 of the material strip 4, which proceeds to the continuous material strip feeding unit 23 by way of a pair of guide rollers 35, 36 and then to a layering table 30. The layering table 30 reciprocates on a track 41 laid on a support structure 39 by a predetermined stroke.

The material strip 4 guided by said guide rollers 35, 36 is then fed through a guide roller 34 to either the pressing roll 28 or 29 of the continuous material strip feeding unit 23 alternately.

When the layering table 30 moves in the direction of arrow XL, a lot of strips of the adhesive agent are applied onto the upper surface of the layered portion 31 of the material strip 4 on the layering table 30 by means of the set of applicators 26 of the adhesive agent applying unit 24 in the operating position 24A. The layered portion 31 of the material strip 4 is clamped by a pair of clamps 37, 38 at the opposite ends. The stripes of the 5 adhesive agent are applied as shown in FIG. 5 running along the longitudinal direction of the layering table as indicated by arrow A. In the embodiment, the stripes are arranged at a pitch P of 23.1 mm, each of the strips has a width C of 5.8 mm in FIG. 5, but the invention is not limited to the pitch and width.

In this mode of operation, the material strip 4 moves in the continuous material strip feeding unit 23 along the solid line. A length of the material strip 4 is pressed by the pressing roll 28 in its operation position 28A against the upper surface of the layered portions 31 of the material strip 4 onto which the adhesive agent has just been applied by the adhesive agent applying unit 24. The length of the material strip 4 is clamped at the rear end by the clamp 37.

When the layering table 30 turns its moving direction and moves in the direction of arrow XR, the applicator 27 of a lot of parallel second stripes of the adhesive agent applying unit 25 now located in its operating position 25A applies the adhesive agent onto the upper surface of the layered portions 31 of the material strip 4. The second stripes of the adhesive agent are arranged at a pitch P of 23.1 mm, and each of the stripes has a width C of 5.8 mm as illustrated In FIG. 6. The second stripes of the adhesive agent are transversely displaced by a half pitch relative to the first stripes of the adhesive agent as shown in FIG. 6. Immediately thereafter, the material strip 4 indicated by the broken line in FIG. 2 is pressed against the surface of the layered portions 31 by the pressing roll 29 located in its operation position 29A and the rear end of the stretch is clamped by the clamp 38.

Then, the above described procedures of operation are repeated until a multilayer structure as illustrated in FIG. 7 is produced. The structure having a width B is then cut to the predetermined width D and then expanded in the vertical direction to produce a honeycomb structure as illustrated in FIG. 8.

In the second embodiment, the adhesive agent applying units 24, 25 and the pressing rolls 28, 29 are located close to each other immediately above the upper surface of the layered portions 31 of the material strip on the layering table. Thus, the adhesive agent are applied on said upper surface of the layered portions 31 in parallel stripes running along the longitudinal direction of the layering table and, immediately thereafter, a stretch of the material strip 4 is folded at the front end under a constant tension and pressed against the upper surface by one of the pressing rolls 28, 29. In an experiment using the embodiment, the material strip was made of nonwoven polyester cloth permeable to gas and water having a weight per unit area of 40 g/m² and a thickness of 0.11 mm, a modified olefin type hot-melt adhesive agent is applied by a roll-transfer method to produce a pattern of adhesive agent of parallel stripes arranged at a pitch P of 23.1 mm, each of the strips having a width C of 5.8 mm, and the honeycomb structure has a cell size of 10 mm.

Figure 3:
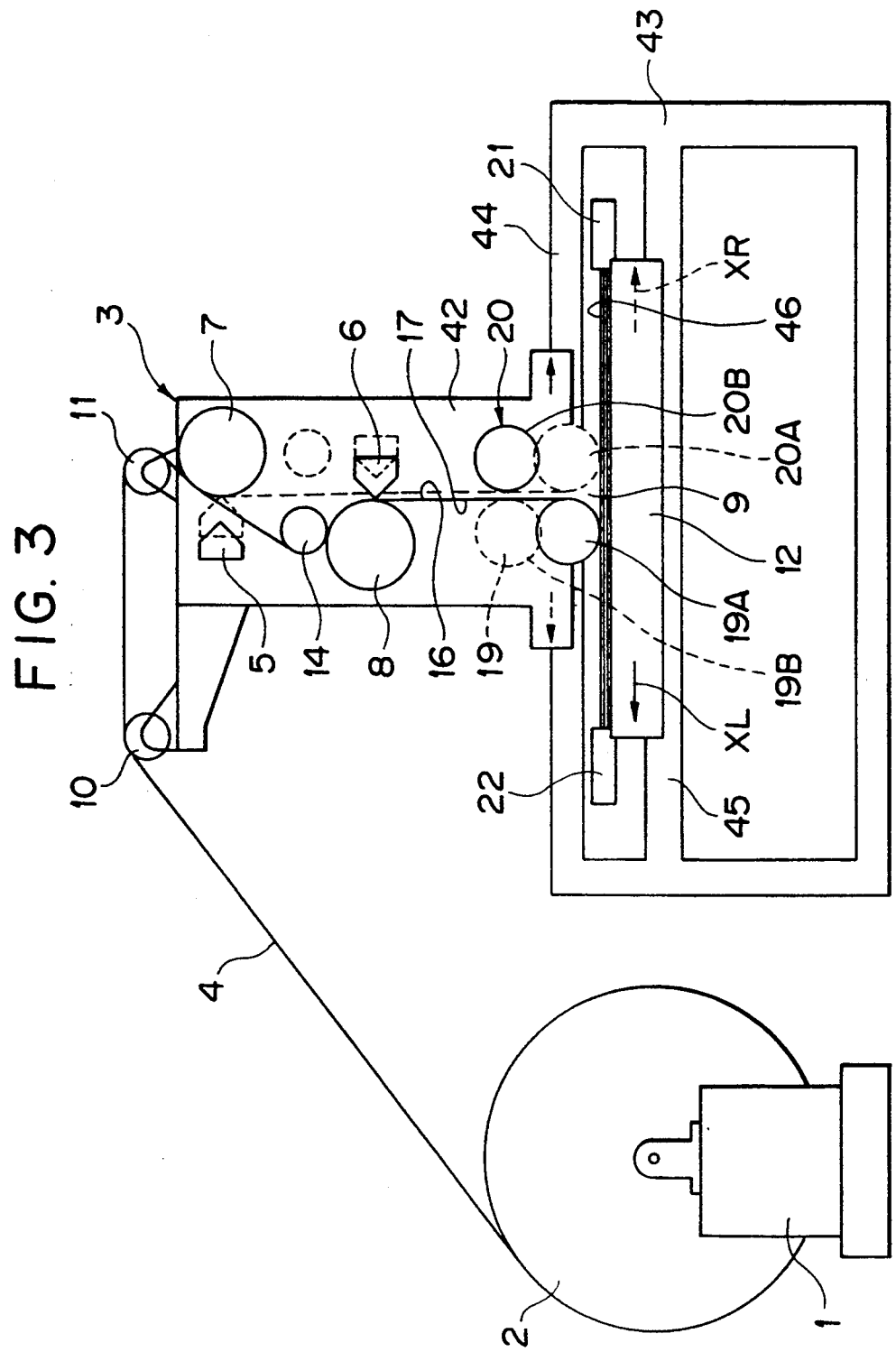
FIG. 3 is a schematic front view of still another embodiment of apparatus for manufacturing laminate for honeycomb structure of the invention.

FIG. 3 shows a third embodiment of the invention. In this embodiment, a pair of adhesive agent applying units 5, 6, a pair of back-up rolls 7, 8 corresponding to the adhesive agent applying units 5, 6, and a pair of pressing rolls 19, 20 located oppositely relative to the feeding orifice 9 for a material strip 4 and immediately above the upper surface of a layering table 12 are same as those of the first embodiment. The adhesive agent applying units 5, 6, the back-up rolls 7, 8, and pressing rolls 19, 20 are fitted to a roll housing stand 42 which acts as the continuous material strip feeding unit 3.

The roll housing stand 42 is so designed as to reciprocate by a predetermined stroke in an concerted manner with the layering table 12 which also reciprocates by a predetermined stroke on a track 45 laid on a support structure 43. The pressing rolls 19, 29 are disposed immediately above an upper surface of layered portions 46 of the material strip 4 on the layering table 12 so that the operation of applying the adhesive agent and that of pressing the uppermost layer of the layered portions 46 can be carried out continuously and repeatedly.

Since the structure and the functions of each of the components housed in the continuous material strip feeding unit 3 of this embodiment are identical to those of the counterpart of the first embodiment of FIG. 1, description for them will be omitted here and only those components that are different from those of the first embodiment will be described below.

When the layering table 12 is moving in the direction of arrow XL in FIG. 3, the roll housing stand 42 disposed above the upper surface of the layered portions 46 of the material strip 4 moves in the opposite direction as indicated by arrow XR, and the adhesive agent applying unit 6 longitudinally (indicated by arrow A) applies the adhesive agent on the side 16 of the material strip in parallel stripes as illustrated in FIG. 5. In an experiment using this embodiment, an epoxy type adhesive agent was applied by using a gravure coating technique onto a material strip 4 which had a thickness of 30 micron and which was hard vinyl chloride strip at a pitch P of 3.5 mm, each stripe having a width C of 0.87 mm.

The side 16 is pressed to the upper surface of the layered portion 46 on the layering table 12 by the pressing roll 19 due to the movement of the layering table 12 in a direction of arrow XL.

When, on the other hand, the roll housing stand 42 is moving in the direction of arrow XL, the second stripes of the adhesive agent are applied to the side 17. As illustrated in FIG. 6, the second stripes of the adhesive agent are displaced transversely by a half pitch from the first strips (illustrated in FIG. 5) of the adhesive agent. The side 17 is pressed onto the layered portion 46 of the material strip 4 by the pressing roll 20 due to the movement of the layering table 12 rightwardly. By repeating the above described procedures of operation, a laminate for honeycomb structure as illustrated in FIG. 7 can be prepared.

The laminate for honeycomb structure was heated and pressed at 50° C. under a pressure of 8 kg/cm² for 60 minutes to thermoset the adhesive agent. The laminate was then cut to a predetermined length and softened in warm water to produce honeycomb structure as illustrated in FIG. 8.

Since the roll housing stand 42 and the layering table 12 move in opposite directions in this embodiment, they show a boosted relative moving speed to consequently raise the rate of producing multilayer structures, and the stroke of the layering table may be reduced.

In the above experiment, a hard vinyl chloride strip having a thickness of 30 micron could be used without any problem as a material strip for producing laminate for honeycomb structures. Consequently a highly dense laminate for honeycomb structure having a cell size of 1.5 mm could be prepared.

Figure 4:
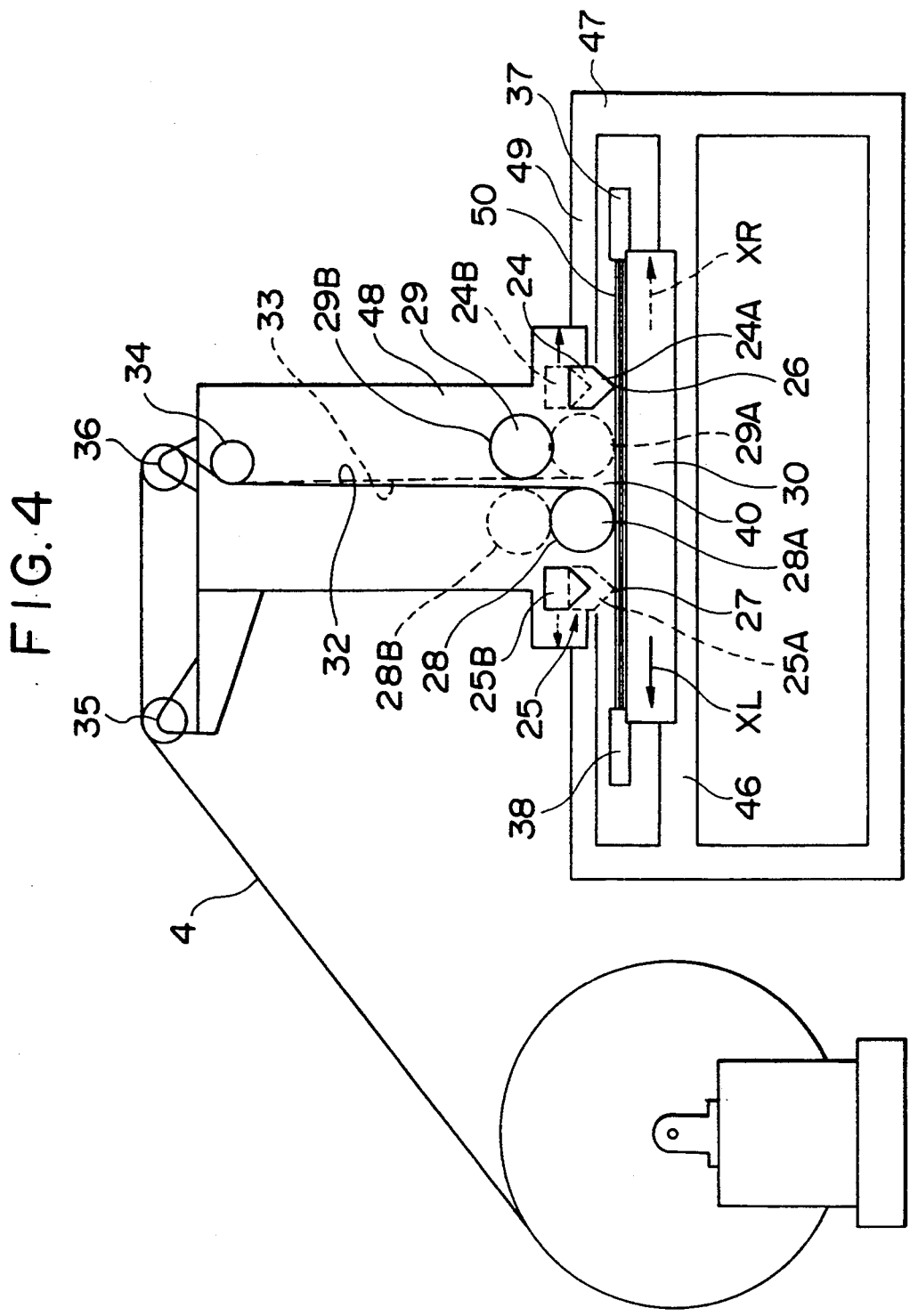
FIG. 4 is a schematic front view of still another embodiment of apparatus for manufacturing laminate for honeycomb structure of the invention.

FIG. 4 illustrates a fourth embodiment of the invention. The adhesive agent applying units 24, 25, the applicators 26, 27 provided to the adhesive agent applying units 24, 25, and the pressing rolls 28, 29 disposed oppositely relative to a material strip feeding orifice 40 and adjacent to the adhesive agent applying units 24, 25 are the same as those in the continuous material strip feeding unit 23 of the embodiment of FIG. 2. These components are housed in and pivotally attached to a roll housing stand 48 of a frame means. The roll housing stand 48 acts as the continuous material strip feeding unit.

The roll housing stand 48 is capable of reciprocating on a track 49 laid on a support structure 47 by a predetermined stroke in the directions indicated by arrows XL and XR in FIG. 4 in a concerted manner with said layering table 30 that also reciprocates on another track 46 also laid on the support structure 47. The pressing rolls 28, 29 are disposed immediately above a layered portion 50 of the material strip 4 laid on the layering table 30 in order to alternately and continuously press lengths of the material strip 4 newly and successively laid on the layered portions 50 of the material strip 4 to the upper surface of which the adhesive agent is applied.

Because the operations of each of the components of this embodiment for feeding the material strip 4 and applying thereto the adhesive agent are similar to those of the embodiment of FIG. 2, description for them will be omitted here and only those components that are different from the above embodiments will be described hereinafter.

When the layering table 30 is moving on the track 46 in the direction of arrow XL in FIG. 4, the adhesive agent is applied to the upper surface of the layered portions 50 of the material strip 4 by the adhesive agent applying unit 24 to form a pattern of parallel stripes running of the adhesive agent in the direction of arrow A of FIG. 5 at a pitch P of 14 mm, each stripe having a width of 3.5 mm, while the roll housing stand 48 is moving on the track 49 in the direction of arrow XR of FIG. 4. The invention is not limited to the above pitch and the width.

During this operation in which the layering table 30 is moving in the direction of arrow XL in FIG. 4, by means of the pressing roll 28, the opposite surface of the surface 32 with the adhesive agent is pressed against an upper surface of the layered portion 50 (the surface applied with the a lot of stripes of the adhesive agent as illustrated in FIG. 5) on the layering table 30 so as to press the material stripe 4 to the layered portion 50.

When, on the other hand, the layering table 30 is moving in the direction of arrow XR, the roll housing stand 48 moves in the direction of arrow XL so that the second stripes of the adhesive agent transversely displaced by a half pitch as illustrated in FIG. 6 is applied by the adhesive agent applying unit 25 onto the upper surface of the layered portion 50 of the material strip 4.

The second adhesive agent is applied to the side 32 as illustrated in FIG. 6 and, immediately thereafter, another stretch of the material strip 4 coming down along the other feeding path indicated by a broken line in FIG. 4 is pressed against the upper surface of the layered portion 50 that carries strips of adhesive agent by the pressing roll 29 with the side 33 of the material strip 4 facing upwardly.

Then, the above procedures of operation are repeated to produce a multilayer structure as illustrated in FIG. 7.

Since the roll housing stand 48 and the layering table 30 moved in opposite directions relative to each other in this embodiment, their relative speed with regard to each other is boosted to raise the rate of folding and pressing the material strip to form a multilayer structure without adversely affecting the precision with which it is formed.

In an experiment using the embodiment of FIG. 4, a laminate for honeycomb structure having a honeycomb cell size of 6.0 mm was prepared by using polyester nonwoven cloth having a thickness of 50 micron and a weight per unit area of 30 g/m$^2$ for the material strip 4 and a modified olefin type hot-melt adhesive agent, which is applied to the material strip 4 in parallel stripes at a pitch P of 14.0 mm, each stripe having a width C of 3.8 mm.

Figure 9:
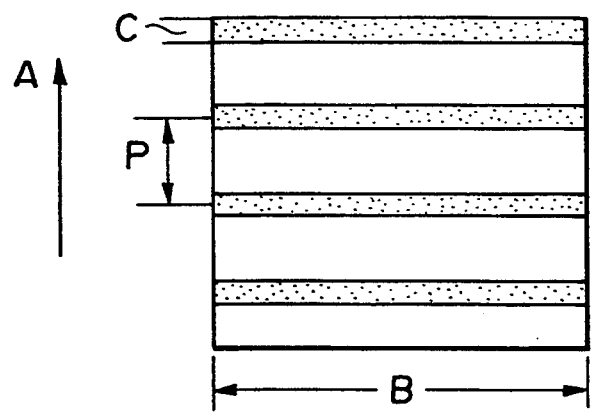
FIG. 9 is a schematic plan view of a material strip to which an adhesive agent is applied in parallel stripes running rectangularly relative to the longitudinal direction of the material strip.
Figure 10:
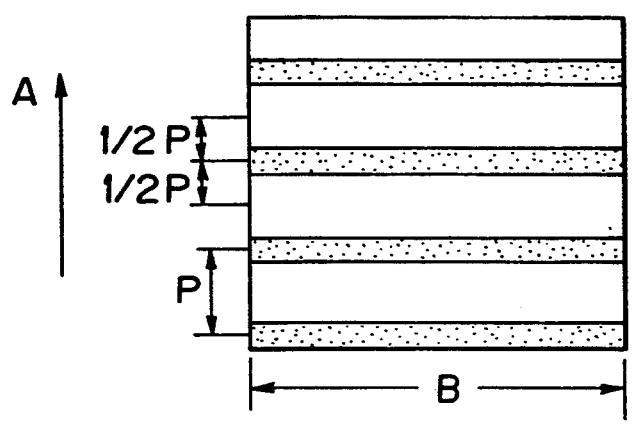
FIG. 10 is a schematic plan view of a material strip similar to FIG. 9 but showing parallel stripes of adhesive agent displaced by a half pitch relative to those of FIG. 9.

In the above described embodiments, the adhesive agent is applied to a material strip 4 longitudinally along direction indicated by arrow A in FIG. 5. However, it may be easily understood that the adhesive agent may alternatively be applied to a material strip transversely, or in a direction perpendicular to the direction of arrow A by using one or more than one applicator rolls provided with a number of grooves arranged on the outer peripheral surface of each of the rolls arranged along the generating line of the peripheral surface as typically illustrated in FIGS. 9 and 10.

In the above described embodiments, a modified olefin type hot-melt adhesive agent or an epoxy type adhesive agent is used. However, the adhesive agent may be appropriately use for the purpose of the present invention also include synthetic resin type adhesives, emulsion type adhesives and synthetic rubber type adhesives. These adhesives may be applied by using a roll transfer or gravure coating technique.

As described above, a method and an apparatus according to the invention are advantageous over conventional methods and apparatuses in that a multilayer structure can be prepared from a continuous material strip without cutting it into unit sheets and the folded and layered material strip can be accurately aligned simply by controlling the opposite turning points of the reciprocating layering table and clamping the folded areas of the material strip.

Additionally, since the adhesive agent applying units and the pressing rolls as well as other appropriate components are arranged near the layering table and operated in a manner that allows the operation of folding and layering a material strip to be carried out continuously so that an additional length of the material strip is quickly laid on the surface of the already layered portions of the material strip after applying the adhesive agent thereto, a molten hot-melt type adhesive agent can be effectively and efficiently used without losing its effect with time.

Thus, a method and an apparatus according to the invention allows the use of a highly viscous molten hot-melt type adhesive agent without permitting it to pass through the material strip from a side to the other thereof even if the material strip is thin and made of a soft and coarse material so that high quality laminate for honeycomb structures may be manufactured.

Since the time from applying the adhesive agent to laying an additional length of the material strip to the layered portions thereof is minimized, a hot-melt adhesive agent of the type that will quickly be cooled and hardened when brought to contact with any other object can be used and any additional steps of heating and pressing the layered material strip are not required. Additionally, the use of a diluent to regulate the viscosity of the adhesive agent is also not required.

When the continuous material strip feeding unit of an apparatus according to the invention is realized in the form of a roll housing stand integral with the support structure and disposed above the layering table in such a manner that said roll housing stand and said layering table moves in opposite directions relative to each other, their relative speed with regard to each other is remarkably increased to raise the rate of folding and layering the material strip and hence the overall efficiency of manufacturing laminate for honeycomb structures.

Since the time from applying the adhesive agent to layering an additional length of the material strip is significantly reduced with such an arrangement, a highly viscous hot-melt type adhesive agent can be effectively used to produce a sufficient adhesiveness even if a very small amount of the adhesive agent is used.

In addition to the above described advantages of the present invention, it is also advantageous for a method and an apparatus according to the invention that the adhesive agent can be applied either longitudinally or transversely relative to the running direction of the material strip by simply altering the arrangement of the adhesive agent applying units.

It is also advantageous for a method and an apparatus according to the invention that an adhesive agent of an appropriate type can be selected from a number of different adhesive agents depending on the type of the material strip to be used.

What is claimed is:

1. A method of manufacturing laminate for a honeycomb structure by moving a layering table and a roll housing stand, the roll housing stand moving in a first direction and the layering table moving in an opposite second direction, said roll housing stand including means for feeding the material strip from one roll, a pair of pressing/bonding rolls and a pair of means for applying a plurality of stripes of the adhesive agent, said method comprising the steps of
   (a) feeding a material strip by a predetermined length to an uppermost surface of a folded and layered material strip disposed on a layering table by forwardly moving said layering table by a stroke corresponding to said length in a first direction and by rearwardly moving said roll housing stand in a second opposite direction,
   (b) applying a plurality of first stripes of an adhesive agent to either the uppermost surface of the layered material strip on said layering table or a lower surface of the material strip being fed by one of a pair of means for applying a plurality of stripes of the adhesive agent when said layering table is moved forwardly and said roll housing stand is moved rearwardly,
   (c) immediately pressing the material strip being fed to the layered material strip by one of a pair of pressing/bonding rolls when said layering table is moved forwardly and said roll housing stand is moved rearwardly,
   (d) folding a rear end of said length of the material strip,
   (e) feeding the material strip by the length to a new upper surface of the folded and layered material strip disposed on the layering table by moving rearwardly said table by said stroke and by moving forwardly said roll housing stand,
   (f) applying a plurality of second stripes of an adhesive agent to either said new upper surface or the lower surface of the material strip being fed by the other of said pair of means for applying a plurality of stripes of the adhesive agent when said layering table is moved rearwardly and said roll housing stand is moved forwardly, said second stripes being displaced transversely by a half pitch from the first stripes of the adhesive agent,
   (g) immediately pressing the material strip being fed to the folded and layered material strip by the other of said pair of pressing/bonding rolls when said layering table is moved forwardly and said roll housing stand is moved rearwardly,
   (h) holding the rear end of said length of the material strip, and
   (i) repeating the above steps (a) to (h).

2. The method according to claim 1, wherein a plurality of stripes of the adhesive agent are applied to a lower surface of the material strip being fed.

3. The method according to claim 1, wherein a plurality of stripes of the adhesive agent are applied to an upper surface of the layered strip on said layering table.

* * * * *